(12) United States Patent
Lemejda

(10) Patent No.: US 9,302,660 B2
(45) Date of Patent: Apr. 5, 2016

(54) METHOD FOR CONTROLLING BRAKING TORQUE IN A TWO-WHEELED VEHICLE WHEN TRAVELING IN AN INCLINED POSITION

(75) Inventor: Markus Lemejda, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 197 days.

(21) Appl. No.: 13/822,753

(22) PCT Filed: Jul. 18, 2011

(86) PCT No.: PCT/EP2011/062225
§ 371 (c)(1),
(2), (4) Date: May 28, 2013

(87) PCT Pub. No.: WO2012/034738
PCT Pub. Date: Mar. 22, 2012

(65) Prior Publication Data
US 2013/0238206 A1    Sep. 12, 2013

(30) Foreign Application Priority Data

Sep. 14, 2010  (DE) .......................... 10 2010 040 674
May 27, 2011  (DE) .......................... 10 2011 076 640

(51) Int. Cl.
| | |
|---|---|
| G06F 7/70 | (2006.01) |
| G06F 19/00 | (2011.01) |
| G06G 7/00 | (2006.01) |
| G06G 7/76 | (2006.01) |
| B60B 39/00 | (2006.01) |
| B60T 7/12 | (2006.01) |
| B60T 8/26 | (2006.01) |
| B60T 8/17 | (2006.01) |

(Continued)

(52) U.S. Cl.
CPC ............... *B60T 8/261* (2013.01); *B60T 8/1706* (2013.01); *B60T 8/1766* (2013.01); *B60T 8/17554* (2013.01); *B60T 2201/16* (2013.01); *B60T 2230/03* (2013.01)

(58) Field of Classification Search
USPC .......................................................... 701/70
See application file for complete search history.

(56) References Cited

U.S. PATENT DOCUMENTS

| | | | | |
|---|---|---|---|---|
| 4,989,922 A | * | 2/1991 | Pickenhahn | .......... B60T 8/1706 180/219 |
| 5,423,601 A | * | 6/1995 | Sigl | ............................... 303/182 |
| 5,445,443 A | * | 8/1995 | Hauser et al. | .................. 303/137 |

(Continued)

FOREIGN PATENT DOCUMENTS

| | | |
|---|---|---|
| CN | 1522911 | 8/2004 |
| DE | 38 39 520 | 5/1990 |

(Continued)

OTHER PUBLICATIONS

International Search Report, PCT International Application No. PCT/EP2011/062225, dated Oct. 14, 2011.

*Primary Examiner* — Yonel Beaulieu
*Assistant Examiner* — Lail Kleinman
(74) *Attorney, Agent, or Firm* — Kenyon & Kenyon LLP

(57) ABSTRACT

In a method for controlling braking torque in a two-wheeled vehicle traveling in an inclined position, the driver specifies a desired braking torque, which is divided into wheel braking torques at the front wheel and at the rear wheel in such a manner, that a steering torque resulting from the wheel braking torques is less than a limiting value.

14 Claims, 2 Drawing Sheets

(51) Int. Cl.
*B60T 8/1755* (2006.01)
*B60T 8/1766* (2006.01)

(56) References Cited

U.S. PATENT DOCUMENTS

| | | | | |
|---|---|---|---|---|
| 5,671,982 | A * | 9/1997 | Wanke | 303/146 |
| 5,732,377 | A * | 3/1998 | Eckert | 701/83 |
| 5,732,379 | A * | 3/1998 | Eckert et al. | 701/83 |
| 5,862,503 | A * | 1/1999 | Eckert et al. | 701/78 |
| 5,925,083 | A * | 7/1999 | Ackermann | 701/41 |
| 6,449,542 | B1 * | 9/2002 | Bottiger et al. | 701/41 |
| 7,681,960 | B2 * | 3/2010 | Wanke et al. | 303/146 |
| 7,686,115 | B2 * | 3/2010 | Parker | 180/219 |
| 8,155,798 | B2 * | 4/2012 | Seiniger et al. | 701/1 |
| 8,583,324 | B2 * | 11/2013 | Niewels et al. | 701/38 |
| 2004/0007412 | A1 * | 1/2004 | Neef et al. | 180/402 |
| 2004/0098185 | A1 * | 5/2004 | Wang | 701/70 |
| 2004/0162662 | A1 * | 8/2004 | Bremeier et al. | 701/70 |
| 2006/0063137 | A1 * | 3/2006 | Robbins | 434/61 |
| 2006/0273657 | A1 * | 12/2006 | Wanke et al. | 303/146 |
| 2008/0040002 | A1 * | 2/2008 | Galkoswki et al. | 701/43 |
| 2008/0202827 | A1 * | 8/2008 | Thiers | 180/6.24 |
| 2008/0315550 | A1 * | 12/2008 | Parker | 280/276 |
| 2009/0118961 | A1 * | 5/2009 | Eckert et al. | 701/71 |
| 2009/0184567 | A1 * | 7/2009 | Hinz et al. | 303/9.64 |
| 2009/0222164 | A1 * | 9/2009 | Seiniger et al. | 701/36 |
| 2010/0023235 | A1 * | 1/2010 | Kremer | B60T 8/1706 701/70 |
| 2011/0273005 | A1 * | 11/2011 | Westerfeld | B60T 8/1706 303/9.64 |

FOREIGN PATENT DOCUMENTS

| | | |
|---|---|---|
| DE | 10 2005 028 995 | 1/2007 |
| DE | 10 2008 011 575 | 9/2008 |
| DE | 10 2008 021 523 | 12/2008 |
| JP | 2-216355 | 8/1990 |
| JP | 2008-546586 | 12/2008 |
| WO | WO 2006/077211 | 7/2006 |

* cited by examiner

METHOD FOR CONTROLLING BRAKING TORQUE IN A TWO-WHEELED VEHICLE WHEN TRAVELING IN AN INCLINED POSITION

FIELD

The present invention relates to a method for controlling braking torque in a two-wheeled vehicle when traveling in an inclined position.

BACKGROUND INFORMATION

In the case of a motorcycle that is cornering, if the wheel brake device at the front wheel is actuated, then a steering torque, which attempts to upright the motorcycle and force it to a greater curve radius, results from the front-wheel braking torque. The reason for the steering torque at the front wheel in response to braking in a curve is the lateral distance between the center of tire contact, which denotes the effective center point of the contact patch, and the vertical axis of the front wheel; the distance becoming greater with increasing inclination angle of the motorcycle. Consequently, the greater the inclined position, the greater the unintentional, generated steering torque becomes during braking.

SUMMARY

An object of the present invention is to improve the driving safety in two-wheeled vehicles during a braking action, when traveling in an inclined position.

The method of the present invention may be used in two-wheeled vehicles, in particular, motorcycles, in order to increase the driving safety during braking, when traveling in an inclined position, in particular, when cornering. This is accomplished by automatically setting the braking torques at the wheel brake devices at the front wheel and at the rear wheel.

The driver inputs a desired braking torque via at least one brake actuating device; generally, the desired braking torque being converted into a corresponding wheel braking torque by the assigned braking device. In the method of the present invention, one may deviate from this, in that the overall wheel braking torques generated correspond to at least the desired braking torque of the driver, but the wheel braking torques are automatically distributed to the front wheel and rear wheel in such a manner, that a steering torque in the two-wheeled vehicle resulting from the wheel braking torques does not exceed an assigned limiting value. Consequently, when only the front wheel brake is actuated, wheel braking torques may be generated exclusively or additionally at the rear wheel. Conversely, when only the rear wheel brake is actuated, it is possible for wheel braking torques to be generated exclusively or additionally at the front wheel. In addition, mixed methods are possible, in which the driver actuates both the front wheel brake and the rear wheel brake, but the corresponding desired torques are deviated from, and instead, in each instance, a portion is generated by the other wheel braking device.

The background of the automatic distribution of wheel braking torques to the front wheel and to the rear wheel is opposed steering torques, which are generated during a braking action at the front wheel and a braking action at the rear wheel while traveling in an inclined position. Such inclined positions normally occur while cornering, but in principle, they may also be brought about by the driver when traveling straight ahead. In the inclined position, the center of tire contact shifts from the center of the outer cover of the tire to the side, which, in the case of a braking action, produces a steering torque about the vertical axis of the wheel in question. At the front wheel, this results in a torque that uprights the two-wheeled vehicle, and at the rear wheel, this results in an oppositely directed torque about the vertical wheel axis of the rear wheel. These wheel yawing torques produce a total steering torque, which, on the whole, results in an uprighting steering torque or in an oppositely directed steering torque as a function of the portions of the wheel yawing torques at the front wheel and at the rear wheel. Compensation for the torques may also be considered.

By specifying a limiting value of a steering torque, which may not be exceeded by the magnitude of the resulting steering torque, it is ensured that the uprighting steering torque or the oppositely directed steering torque remains small enough, so that the handling is not affected or at least not affected in a significant manner. At the same time, the driver's desired braking torque may even be completely implemented, when the brake actuation at the front wheel and/or at the rear wheel, which is specified by the driver, is deviated from.

If, for example, the driver brakes at the front wheel while traveling in an inclined position, this results in an uprighting torque. By automatically distributing the braking torque with a portion of the wheel braking torque at the rear wheel, a compensating, oppositely directed steering torque is generated, so that the total steering torque remains below the assigned limiting value.

According to a useful further refinement, it is provided that the wheel braking torques be distributed between the front wheel and rear wheel in such a manner, that a minimum steering torque is attained or surpassed. While braking in a curve in an inclined position, the motorcycle must upright itself in order to ultimately assume an upright position when stopped. The minimum steering torque necessary for this may be attained by suitably distributing the wheel braking torques. Thus, one obtains a total steering torque, which is advantageously between a lower limiting value and an upper limiting value. The upper limiting value ensures that the two-wheeled vehicle does not experience too high a steering torque, which affects the driving stability or at least the subjective driving feel of the driver. The lower limiting value ensures a minimum steering torque, which makes it easier to upright the two-wheeled vehicle when it is decelerated to a dead stop.

The method is preferably used in two-wheeled vehicles having wheel brake devices, which are constructed as hydraulic wheel brakes.

According to a further, useful variant, for the case in which the demanded wheel braking torque at a vehicle wheel is not transmittable to the road at its full magnitude, e.g., due to a reduced normal force, such as in the case of driving over a hilltop, or due to a reduced frictional ratio, the gradient of build-up of the wheel braking torque at the other vehicle wheel is limited. By this means, the driver is given time for his own reaction, in order to be able to keep the two-wheeled vehicle in the desired lane himself.

According to another advantageous variant, the desired braking torque of the driver is converted into an effective wheel braking torque in a time-delayed manner. With this, the driver is also given time for his own reaction.

In a further useful variant, the sum of the actual wheel braking torques goes over and above the desired braking torque of the driver, to the extent that the implementation of the sharper deceleration is theoretically possible and the increased wheel braking torques are transmittable to the road surface. Such increased deceleration may optionally be initiated by a driver assistance system, for example, by a so-called brake assist system. In this case, the deceleration is carried out in such a manner, that the steering torque resulting from the wheel braking torques does not exceed the assigned limiting value. Consequently, the boundary condition affecting the steering torque also applies in the case of boosting a braking torque. In this connection, the additional wheel braking torque is advantageously set as a function of current driving state variables, for example, as a function of the vehicle speed and/or the angle of inclination. The wheel braking torque of the vehicle wheel, which is not acted upon by the additional torque, may also be considered.

To ascertain the yawing torques at the front wheel and the rear wheel, which are responsible for the steering torque, the lateral distance of the center of tire contact from the respective vertical wheel axis and the respective wheel braking force are determined; the lateral distance being determined as a function of the angle of inclination, since the distance also becomes greater with increasing angle of inclination. The wheel braking force at a vehicle wheel is determined from the respective wheel braking torque; in the case of hydraulic wheel brakes, the wheel braking forces being a linear function of the brake pressures as a first approximation.

With knowledge of the wheel yawing torques, the total steering torque may be ascertained in view of geometric factors, via which the geometric structural conditions in the two-wheeled vehicle may be considered, for example, a steering head angle deviating from the vertical axis. The geometric factors are multiplied by the respective wheel yawing torques of the wheels, the total steering torque resulting from the difference of the wheel yawing torque at the front wheel weighted by the geometric factor and the wheel yawing torque at the rear wheel weighted by the assigned geometric factor. This total steering torque may not exceed the limiting value of the steering torque, which is why the wheel braking torques are suitably distributed to the front and rear wheels.

An inclination sensor, which measures the angle of inclination, is advantageously provided in the two-wheeled vehicle for ascertaining the angle of inclination. In the case of hydraulic wheel brakes, pressure sensors are also advantageously situated at the front wheel brake and the rear wheel brake, the specific brake pressures being able to be measured by the pressure sensors. The wheel braking forces may be ascertained from the brake pressures.

The method according to an example embodiment of the present invention proceeds on a closed-loop or open-loop control unit, which is part of the braking system in a two-wheeled vehicle or communicates with such a braking system.

Further advantages and useful variants can be gathered from the description below and the figures.

DETAILED DESCRIPTION OF EXAMPLE EMBODIMENTS

Figure 1:
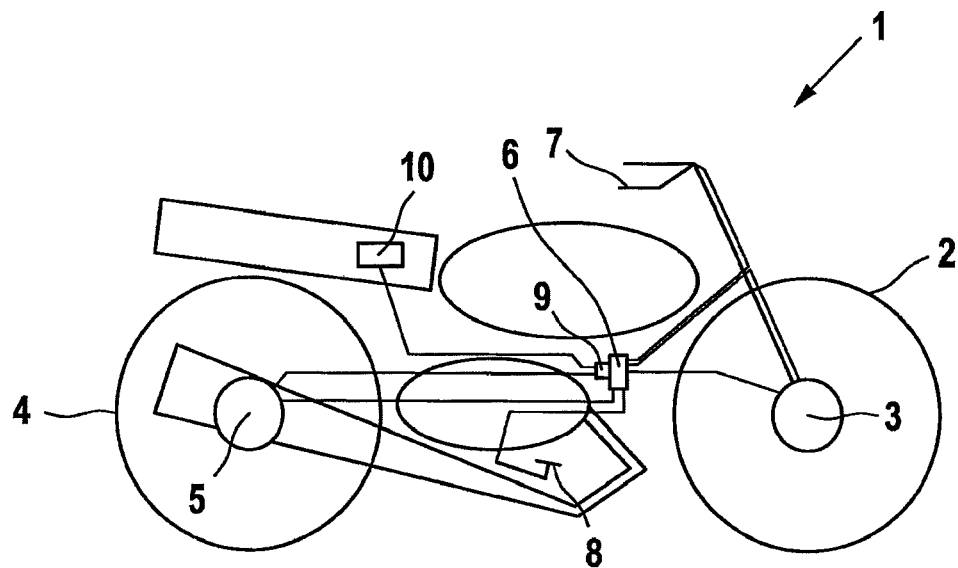
FIG. 1 shows a schematic representation of a motorcycle.

As can be gathered from FIG. 1, motorcycle 1 has a front wheel brake 3 at front wheel 2 and a rear wheel brake 5 at rear wheel 4; front wheel brake 3 and rear wheel brake 5 each being manufactured as hydraulic braking devices and being supplied with hydraulic fluid by a hydraulic brake unit 6. The driver may specify his braking intent for front wheel brake 3 via a brake lever 7 situated at the steering wheel, and his braking intent for rear wheel brake 5 via a further brake lever 8 operated by foot. The wheel braking torques are set using actuating signals of a closed-loop or open-loop control unit 9, which receives the information about the actuation of brake levers 7 and 8 and is also supplied sensor signals, in particular, for the hydraulic brake pressure. Also situated in motorcycle 1 is an inclination sensor 10, with the aid of which the inclined position of the motorcycle with respect to the road surface, or optionally, based on the earth's gravity, may be ascertained. Angle of inclination $\phi$ is also supplied to closed-loop or open-loop control unit 9 as an input signal.

Figure 2:
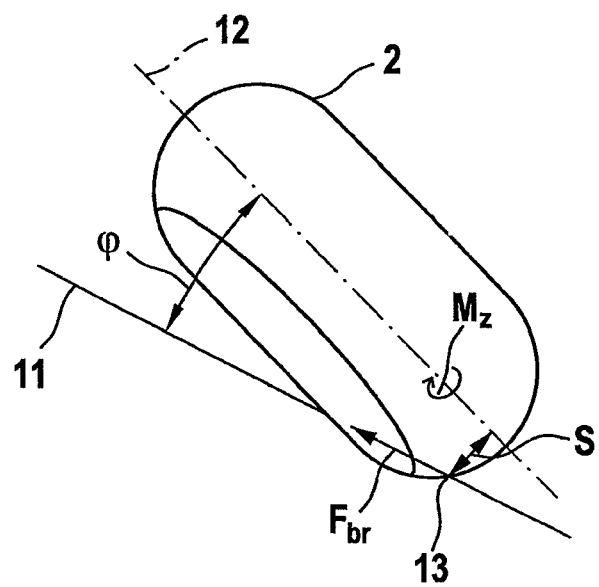
FIG. 2 shows a representation of a wheel in an inclined position.

The geometric conditions, as well as forces and torques at a vehicle wheel 2, when traveling in an inclined position while simultaneously braking, are represented in FIG. 2. The vertical wheel axis is denoted by 12, the inclined position is characterized by angle of inclination $\phi$, which indicates the lateral deflection of wheel 2 from the upright position, based on road surface 11. In an inclined position having angle of inclination $\phi$, center of tire contact 13, which denotes the effective center point of the tire contact patch, shifts from the center of the outer cover of the tire to the side. Accordingly, center of tire contact 13 is at a lateral distance s from vertical wheel axis 12, which runs through the center of wheel 2. In this connection, lateral distance s is a function of angle of inclination $\phi$.

During braking, a braking torque, which produces a braking force $F_{br}$ at center of tire contact 13, is exerted on wheel 2. Due to lateral distance s from the center of wheel 2, a wheel yawing torque $M_z$ about vertical axis 12 of the wheel is generated by this means.

Angle of inclination $\phi$ is determined by measurement, and lateral distance s may be ascertained as a function of angle of inclination $\phi$. Braking force $F_{br}$ may be derived from the known brake pressure in the wheel brake, e.g., as a first approximation, from a linear functional relationship. Using this information, it is possible to ascertain wheel yawing torques $M_{z,\,front}$, $M_{z,\,rear}$ for the front wheel and for the rear wheel, respectively, according to the following equations:

$$M_{z,front}=s_{front}(\phi)\cdot F_{br,front}$$

$$M_{z,rear}=s_{rear}(\phi)\cdot F_{br,rear}.$$

In this case, the front wheel is denoted by the subscript "front," and the rear wheel is denoted by the subscript "rear."

When the wheel yawing torques are known, a total steering torque $M_{steer}$ may be calculated according to the equation below, in further view of geometric factors $\gamma_{front}$ and $\gamma_{rear}$, by which, for example, a steering head angle deviating from the vertical wheel axis is taken into account:

$$M_{steer}=\gamma_{front}\cdot M_{z,front}-\gamma_{rear}\cdot M_{z,rear}.$$

Wheel yawing torques $M_{z,front}$, $M_{z,rear}$ at the front wheel and at the rear wheel act in opposite directions in response to applying a braking force, which means that total steering torque $M_{steer}$ is calculated from the difference of the weighted wheel yawing torques at the front wheel and at the rear wheel.

In the method for controlling braking torque, the magnitude of total steering torque $M_{steer}$ is intended to be less than a limiting value $M_{steer,lim}$:

$$|M_{steer}|<M_{steer,lim}.$$

This should ensure a high driving stability. In order to achieve this, desired braking torque $M_{br,des}$, which the driver inputs via the brake lever, is automatically distributed between the front wheel brake and the rear wheel brake in such a manner, that the above-mentioned condition is satisfied.

Figure 3:
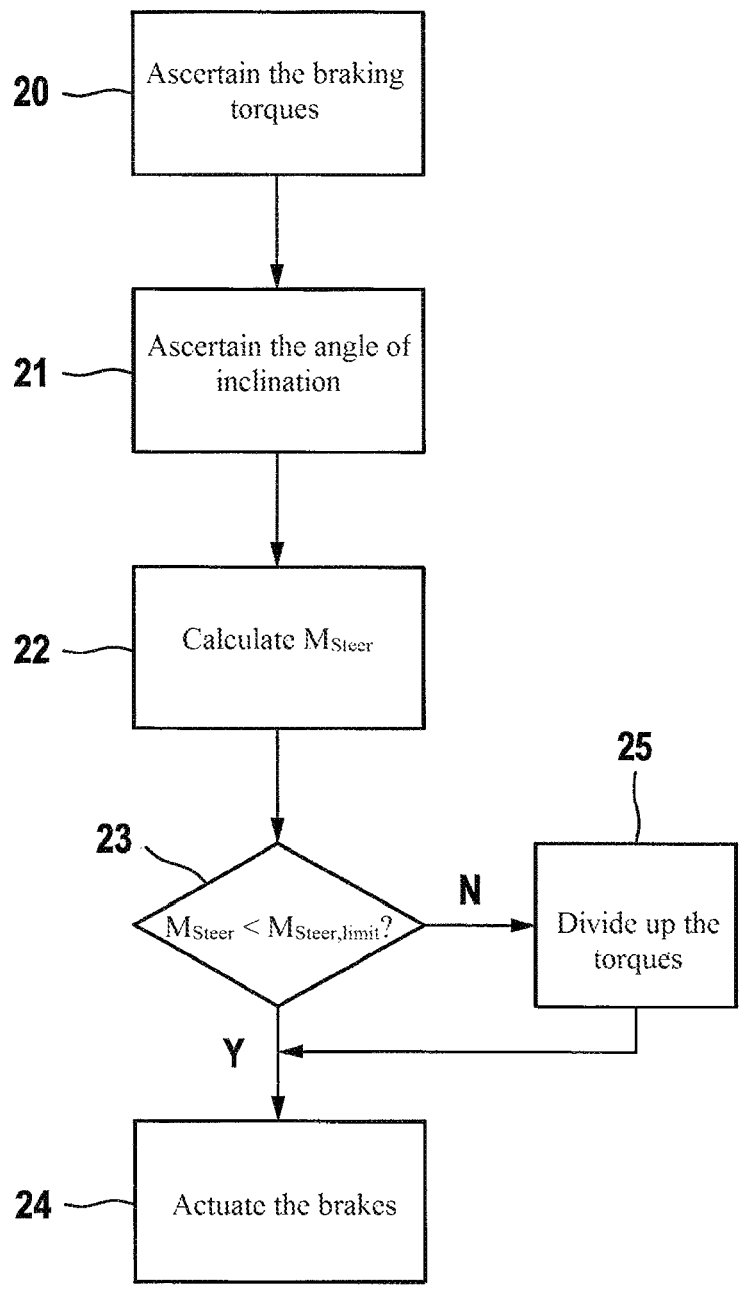
FIG. 3 shows a flow chart for executing the method for controlling braking torque in a motorcycle when traveling in an inclined position.

A simplified, schematic representation of a flow chart for executing the method for controlling braking torque is shown in FIG. 3. In a first method step 20, desired braking torques. $M_{br,front,des}$ at the front wheel and $M_{br,rear,des}$ at the rear wheel, which are specified by the driver, are ascertained. This may be accomplished using the generated hydraulic pressure, which is produced in response to actuating the wheel brake lever.

In the next method step 21, angle of inclination φ is ascertained by measuring it with the aid of the inclination sensor. Subsequently, wheel yawing torques $M_{z,front}$ about the vertical axis of the front wheel and $M_{z,rear}$ about the vertical axis of the rear wheel, from which total steering torque $M_{steer}$ may be calculated, as described above, are calculated in step 22.

In method step 23, a query is made as to whether or not the magnitude of total steering torque $M_{steer}$ is less than assigned limiting value of the steering torque $M_{steer,lim}$. If this is the case, then yes-branch ("Y") is followed to the next method step 24, and the wheel brakes at the front wheel and at the rear wheel are actuated in accordance with the driver's command. However, if this is not the case, then no-branch ("N") is followed to method step 25, in which the wheel braking torques are divided up automatically, i.e., independently of the driver, so that the condition from method step 23, according to which the total steering torque must be less than the assigned limiting value, is satisfied. The desired braking torque of the driver, which results from the sum of the individual, desired braking torques for the front wheel brake and the rear wheel brake, should also be retained as a boundary condition after a redistribution of the wheel braking torques between the front and rear wheel brakes.

After ascertaining the new distribution of the wheel brake torques, the method continues to method step 24, in which the wheel brakes are acted upon by the ascertained braking torques.

What is claimed is:

1. A method for controlling braking torque in a braking system of a two-wheeled vehicle, the vehicle having a front wheel and a rear wheel, the method comprising:
    ascertaining a desired braking torque via at least one brake actuating device;
    dividing, using a control unit, the desired braking torque into a front wheel braking torque at the front wheel and a rear wheel braking torque at the rear wheel, wherein a sum of the front wheel braking torque and the rear wheel braking torque is equal to the desired braking torque;
    calculating a front wheel yawing torque based on the front wheel braking torque, a rear wheel yawing torque based on the rear wheel braking torque, and a total steering torque as the weighted difference between the front wheel yawing torque and the rear wheel yawing torque;
    comparing the total steering torque to a limiting value of the steering torque;
    actuating the front wheel braking torque at the front wheel and the rear wheel braking torque at the rear wheel, if the total steering torque is less than the limiting torque value; and
    dividing, using a control unit, the desired braking torque into a second front wheel braking torque at the front wheel and a second rear wheel braking torque at the rear wheel, and actuating the second front wheel braking torque at the front wheel and the second rear wheel braking torque at the rear wheel, if the total steering torque is greater than the limiting torque value;
    wherein a second total steering torque as the weighted difference between a second front wheel yawing torque and a second rear wheel yawing torque is less than a limiting value of the steering torque.

2. The method as recited in claim 1, wherein the total steering torque is greater than or equal to a minimum steering torque.

3. The method as recited in claim 1, wherein when the front wheel braking torque is not transmittable to a road at a full magnitude, the gradient of build-up of the rear wheel braking torque is limited.

4. The method as recited in claim 1, wherein the desired braking torque is actuated at the front wheel and at the rear wheel in a time-delayed manner.

5. The method as recited in claim 4, wherein the vehicle includes a driver assistance system for generating an additional wheel braking torque, and wherein the total steering torque resulting from the additional wheel braking torque is less than the limiting value of the steering torque.

6. The method as recited in claim 1, wherein the second front wheel braking torque and the second rear wheel braking torque are set as a function of at least one of a vehicle speed, an angle of inclination, and the wheel braking torque at the other vehicle wheel.

7. The method as recited in claim 6, wherein the front wheel yawing torque and the rear wheel yawing torque are ascertained from a lateral distance of a center of tire contact from a vertical wheel axis.

8. The method as recited in claim 7, wherein the lateral distance is determined as a function of the angle of inclination.

9. The method as recited in claim 7, wherein the front wheel braking torque and the rear wheel braking torque are ascertained from a brake pressure of a hydraulic wheel brake device.

10. The method as recited in claim 6, wherein the angle of inclination is measured.

11. A control unit for controlling braking torque in a braking system of a two-wheeled vehicle, the vehicle having a front wheel and a rear wheel, comprising:
    a control device configured to perform:
    ascertaining a desired braking torque via at least one brake actuating device;
    dividing the desired braking torque into a front wheel braking torque at the front wheel and a rear wheel braking torque at the rear wheel, wherein a sum of the front wheel braking torque and the rear wheel braking torque is equal to the desired braking torque;
    calculating a front wheel yawing torque based on the front wheel braking torque, a rear wheel yawing torque based on the rear wheel braking torque, and a total steering torque as the weighted difference between the front wheel yawing torque and the
    rear wheel yawing torque;
    comparing the total steering torque to a limiting value of the steering torque;
    actuating the front wheel braking torque at the front wheel and the rear wheel braking torque at the rear wheel, if the total steering torque is less than the limiting torque value; and
    dividing the desired braking torque into a second front wheel braking torque at the front wheel and a second rear wheel braking torque at the rear wheel, and actuating the second front wheel braking torque at the front wheel and the second rear wheel braking torque at the rear wheel, if the total steering torque is greater than the limiting torque value;

wherein a second total steering torque as the weighted difference between a second front wheel yawing torque and a second rear wheel yawing torque is less than a limiting value of the steering torque.

12. A brake system for controlling braking torque in a two-wheeled vehicle, the vehicle having a front wheel and a rear wheel, comprising:
a front brake;
a rear brake; and
a control device configured to perform the following:
ascertaining a desired braking torque via at least one brake actuating device;
dividing the desired braking torque into a front wheel braking torque at a front wheel and a rear wheel braking torque at a rear wheel, wherein a sum of the front wheel braking torque and the rear wheel braking torque is equal to the desired braking torque;
calculating a front wheel yawing torque based on the front wheel braking torque, a rear wheel yawing torque based on the rear wheel braking torque, and a total steering torque as the weighted difference between the front wheel yawing torque and the
rear wheel yawing torque;
comparing the total steering torque to a limiting value of the steering torque;
actuating the front wheel braking torque at the front wheel and the rear wheel braking torque at the rear wheel, if the total steering torque is less than the limiting torque value; and
dividing the desired braking torque into a second front wheel braking torque at the front wheel and a second rear wheel braking torque at the rear wheel, and actuating the second front wheel braking torque at the front wheel and the second rear wheel braking torque at the rear wheel, if the total steering torque is greater than the limiting torque value;
wherein a second total steering torque as the weighted difference between a second front wheel yawing torque and a second rear wheel yawing torque is less than a limiting value of the steering torque.

13. The method as recited in claim 1, wherein the second total steering torque is greater than or equal to a minimum steering torque.

14. The method as recited in claim 1, wherein when the rear wheel braking torque is not transmittable to a road at a full magnitude, the gradient of build-up of the front wheel braking torque is limited.

* * * * *